Patented Oct. 2, 1951

2,569,449

UNITED STATES PATENT OFFICE 2,569,449

AQUEOUS EMULSION POLYMERIZATION OF STYRENE IN THE PRESENCE OF A SALT OF DEHYDROABIETIC ACID

Joseph N. Borglin, Wilmington, Del., and Philip A. Ray, Denver, Colo., assignors to Hercules Powder Company, Wilmington, Del., a corporation of Delaware No Drawing. Original application July 7, 1945, Serial No. 603,746. Divided and this application August 19, 1948, Serial No. 45,217

3 Claims. (Cl. 260—93.5)

This invention relates to an improved process for the emulsion polymerization of unsaturated compounds and, more particularly, to an improved process of polymerizing vinyl compounds to provide improved synthetic rubberlike materials.

It is well known that unsaturated compounds, particularly those containing the vinyl group, may be advantageously polymerized in aqueous emulsion. Synthetic rubberlike materials have been prepared by polymerizing in aqueous emulsion, diolefins, halogen derivatives of diolefins or other substituted diolefins or by interpolymerizing diolefins with other compounds containing a vinyl group, such as styrene, acrylic acid esters, and acrylic acid nitrile. Polymers such as polyvinyl halides, polyvinyl acetate, polystyrene, polymethyl methacrylate and various other addition polymers also have been prepared by polymerization in aqueous emulsion. Soaps of fatty acids are the most commonly used emulsifying agents for polymerizations of this type.

Fatty acid soaps, although effective emulsifying agents for the polymerization of vinyl compounds, are not sufficiently water-soluble and are, therefore, quite difficult to remove from the polymerization products. The presence of fatty acids in the polymer has many disadvantages. Their presence in transparent plastic materials causes cloudiness. In the case of rubberlike polymers, the fatty acid soap remaining in the polymer is converted to free fatty acid, when salt and acid are added, as is commonly done, in the precipitation of the polymer. Fatty acids weaken the rubber and must, therefore, be removed from it and their complete removal is very difficult.

Now in accordance with this invention, it has been found that the alkali metal salts of dehydroabietic acid may be used as emulsifying agents with very advantageous effects for the polymerization of vinyl compounds which are capable of being polymerized by a peroxide catalyst, the polymer resulting from this process having a superior tensile strength, flex life and tack.

The alkali metal salts of dehydroabietic acid have been found to be excellent emulsifying agents in the preparation of polymers by emulsion polymerization. They also have the advantage of being readily washed out of the polymer and, as a result, transparent plastic polymers prepared by this means are free from cloudiness. Furthermore, the presence of dehydroabietic acid has been found to materially increase the tack in rubber polymers, such as the copolymer of butadiene and styrene. The physical properties after cure of these polymers are also improved.

The following examples are illustrative of the preparation of polymers by emulsion polymerization and the products thereof in accordance with this invention. All parts given in the examples represent parts by weight.

*Example I*

Ten parts of dehydroabietic acid in 400 parts of water were neutralized with sodium hydroxide. To this neutral soap solution 0.6 part of potassium persulfate, 1 part of lauryl mercaptan, 50 parts of styrene and 150 parts of butadiene were added. The mixture was agitated at 50° C. for 14 hours in a sealed container. The emulsion was then run into an open vessel containing 20 parts of an aqueous solution of phenyl-beta-naphthylamine, stripped of the excess butadiene and the polymer precipitated by the addition of an excess of a saturated salt solution. The precipitated polymer was washed with water until alkali free, then with alcohol and finally was dried to constant weight on a mill. A 79% yield of polymer was obtained.

*Example II*

To 400 parts of a 2½% aqueous solution of sodium dehydroabietate, containing an excess of 200% of sodium hydroxide, were added 45 parts of styrene, 136 parts of butadiene and 4.8 parts of tertiary-butyl hydroperoxide. The mixture was agitated at 50° C. for 12 hours in a sealed container. An 89% yield of polymer was obtained by precipitation with a concentrated salt solution.

In order to compare the use of a dehydroabietic acid soap with that of ordinary rosin soap, the following control was run: To 400 parts of a 2½% aqueous solution of rosin soap, prepared from N wood rosin and containing a 200% excess of sodium hydroxide, 6 parts of potassium persulfate, 1.6 parts of isoamyl alcohol, 45 parts of styrene and 136 parts of butadiene were added. On carrying out the polymerization as described in the above example, a 23% yield of polymer was obtained. From these results, it may be seen that the use of an alkali metal salt of dehydroabietic acid results in a greatly increased yield over that obtained by the use of rosin soap.

*Example III*

To 400 parts of an aqueous solution of 2½% sodium dehydroabietate containing a 100% excess of sodium hydroxide 1.6 parts of isoamyl alcohol, 45 parts of styrene, 136 parts of isoprene, and 3 parts of tertiary-butyl hydroperoxide containing about 10% of active oxygen were added. The polymerization was carried out as in Example II. A 100% yield of polymer was obtained.

*Example IV*

Ten parts of dehydroabietic acid in 400 parts of water were neutralized with sodium hydroxide. To this neutral soap solution 5.5 parts of tertiary-butyl hydroperoxide solution (60% peroxide), 150 parts of butadiene and 50 parts of acrylonitrile were added. The mixture was agitated at 50° C. for 14 hours in a sealed container. The polymer was precipitated, washed and dried as described in Example I. A 77% yield of butadiene-acrylonitrile polymer was obtained.

*Example V*

Ten parts of dehydroabietic acid in 400 parts of water were neutralized with sodium hydroxide. To this neutral soap solution 0.2 part of benzoyl peroxide and 200 parts of styrene were added. The mixture was agitated at 50° C. for 16 hours in a sealed container. The polymer was precipitated, washed with water and alcohol, and then dried to constant weight in a vacuum oven at 60° C. The yield of polystyrene was 79%.

*Example VI*

One part of benzoyl peroxide was dissolved in 100 parts of methyl methacrylate. To this solution 200 parts of a 2½% solution of sodium dehydro abietate were added. The mixture was agitated at 50° C. for 16 hours. A 90% yield of polymethyl methacrylate was obtained. When swollen in methyl ethyl ketone the polymer was clear.

When a fatty acid soap (a mixture of potassium palmitate and stearate) was substituted for the sodium dehydroabietate used above, an 85% yield of polymer was obtained, which, when swollen, was very opaque.

The dehydroabietic acid soaps described in accordance with this invention are prepared by neutralization of dehydroabietic acid with an alkali metal compound, basic in nature. Alkali compounds suitable for this purpose are the hydroxides, carbonates, etc., of sodium, potassium, etc. The soap may be prepared in situ, i. e., the dehydroabietic acid may be added to the monomeric material and a solution of alkali added, or the soap may be incorporated in the form of a paste or in the form of a dry soap.

Dehydroabietic acid may be prepared by the dehydrogenation or disproportionation of pure abietic acid or by the dehydrogenation or disproportionation of natural rosin or a rosin material containing a substantial amount of a natural rosin followed by separation of the acid from the dehydrogenated or disproportionated rosin, or by any other known means. The rosins which may be dehydrogenated or disproportionated may be gum or wood rosin. If desired, the rosin may be isomerized, by treatment with an acidic isomerizing agent, prior to dehydrogenation or disproportionation.

The dehydrogenation or disproportionation reaction is carried out by contacting the rosin or rosin material at an elevated temperature with an active hydrogenation catalyst in the absence of added hydrogen to effect a dehydrogenation or disproportionation reaction. Catalysts such as palladium, platinum, nickel, copper chromite, etc., are suitable. The catalyst may be supported on a carrier, such as granular alumina, fibrous asbestos, or activated charcoal. Dehydrogenation or disproportionation with a palladium catalyst, for example, may be conducted either by a batchwise or continuous procedure. Thus, the rosin may be agitated with about 5 to about 20% by weight of a palladium catalyst supported on activated carbon (1 to 2% palladium) at about 150° C. to about 300° C. for about 1 to about 5 hours. In the continuous process, the molten rosin flows over the supported palladium catalyst at a temperature within the range of about 225° C. to about 300° C. to provide a contact time of about ¼ hour to about 1 hour.

It often is advantageous to refine the whole rosin prior to its dehydrogenation or disproportionation, and the same is true as applied to the whole dehydrogenated or disproportionated product. Prior to its dehydrogenation or disproportionation the rosin may be refined by crystallization, by means of a selective solvent such as furfural or phenol, or by an absorbent earth.

With absorbent earths, such as fuller's earth or Percol, Percol being a special grade of bentonite which has been treated with sulfuric acid, the rosin may be refined by contacting a gasoline solution of the rosin with the earth, either batchwise or by passing the solution continuously through a column packed with the absorbent. The rosin solution is kept under an atmosphere of carbon dioxide or other inert gas throughout the refining procedure, and, after being filtered, is distilled to remove the solvent. The color of the rosin is improved by this procedure, and, after dehydrogenation or disproportionation, the product gives improved yields of vinyl polymerizates when used in accordance with this invention.

The whole dehydrogenated or disproportionated rosin also may be refined, as by distillation, heat-treatment, alkali extraction, precipitation, etc. The heat-treatment of dehydrogenated or disproportionated rosin may be carried out either in vacuum or in the presence of an inert gas, such as nitrogen or carbon dioxide, by heating the rosin material at a temperature between about 220° C. and about 270° C. for about 2 to about 15 hours. Utilizing vacuum the temperature preferably is between about 220° C. and about 240° C., while in the case of an inert atmosphere it is between about 240° C. and about 260° C. The heat-treatment may be combined with the dehydrogenation or disproportionation reaction by correlation of the desirable conditions for each process. By utilizing a heat-treatment the activity of the dehydrogenated or disproportionated rosin, when used in the form of its alkali metal salts as emulsifier for vinyl polymerizations, is increased.

In refining dehydrogenated or disproportionated rosin by means of an alkaline extraction the rosin is dissolved in a suitable solvent, such as gasoline, and the resulting solution agitated vigorously with an aqueous alkali, such as sodium hydroxide, resulting in the formation of an emulsion stable at room temperature. The concentration of the alkali should not be above 4% and the extraction is carried out only once. Cooling the emulsion causes it to break into two layers, and from the aqueous layer is obtained dehydrogenated or disproportionated rosin acids in 95% yield based on the total acids (88% based on the total rosin treated) and having an acid number of 185–186. The acids, in the form of their alkali metal salts, give high yields in the emulsion polymerization of vinyl compounds.

Similar to the above procedure is a refining method which involves precipitation of the alkali metal or ammonium salts of dehydrogenated or disproportionated rosin. The rosin is dissolved in acetone, ethanol, isopropanol, or petroleum ether and the resulting solution treated with an alcohol solution of an alkali, such as sodium hydroxide. The use of isopropanol as the solvent and alcoholic sodium hydroxide as the alkali is preferable. The sodium salts of the dehydrogenated or disproportionated rosin acids precipitate immediately and are separated from the solution by filtration. The product is a uniform, very white, fairly dense powder which is useful as the emulsifying agent in accordance with this invention.

Another refining procedure applicable to the rosin prior to its dehydrogenation or disproportionation and also to the dehydrogenated or disproportionated product involves the precipitation of the rosin acids as the insoluble salts of certain organic amines, namely, hydroaromatic amines having at least one fully saturated cyclic nucleus, aliphatic amines, aliphatic hydroxyamines and polyalkyl polyamines. The rosin material is dissolved in a suitable solvent such as acetone, isopropanol, Hi-Flash naphtha or gasoline, and the resulting solution is treated with organic amines such as cyclohexylamine, tetraethylene pentamine, 2-amino-2-methyl-1-propanol and diethylamine. The amine salts precipitate at once and are separated from the solution by filtration or centrifugation. Decomposition of the amine salts with heat or acid regenerates the free acids.

Dehydroabietic acid itself may be separated from the dehydrogenated or disproportionated rosin by various means, crystallization from a solvent solution being a practical method. For example, the dehydrogenated or disproportionated rosin may be heated with acetone to effect solution and the solution cooled and filtered to remove the crystals of dehydroabietic acid. Solvents such as ethyl acetate, ethyl alcohol, methyl alcohol, petroleum ether, etc., may be used in place of acetone. Another method of separating the dehydroabietic acid is by the sulfonation of dehydrogenated or disproportionated rosin and subsequent hydrolysis of the sulfonic acid, whereby a pure dehydroabetic acid is obtained. The dehydroabietic acid need not be pure dehydroabietic acid for the purpose of this invention, however. As discussed previously, various refined dehydrogenated or disproportionated rosins are suitable. Any rosin, or derivative thereof, which contains at least 45%, and preferably at least 50%, dehydroabietic acid may be utilized. The dehydrogenated or disproportionated rosin also should contain less than 1% abietic acid and be free of other inhibitors.

While fatty acid soaps are the most commonly used soaps for emulsion polymerization reactions, they have many disadvantages as noted above. Ordinary rosin soaps, on the other hand, are not practical emulsifying agents for these reactions since they result in a yield of less than 25% of polymer. By using the soaps of dehydroabietic acid as emulsifying agents, the yield of polymer is high at a satisfactory rate or comparable to that of the fatty acid soaps. These facts are clearly illustrated by the foregoing examples. In addition to this advantage, the polymer formed is consistently more uniform in its tensile properties than when fatty acid soaps are used as the emulsifying agent.

In contrast to fatty acids which weaken synthetic rubbers, dehydroabietic acid has been found to produce beneficial effects on these rubbers. The tensile strength, flex life, tack and other physical properties are improved by the presence of dehydroabietic acid in the polymeric material. An amount of dehydroabietic acid up to about 10% is particularly advantageous.

One means of incorporating small amounts of dehydroabietic acid in a rubbery polymer is through the use of alkali metal salts of dehydroabietic acid as emulsifying agents in the preparation of the polymer as shown in the foregoing examples. By carrying out the polymerization in an aqueous emulsion in the presence of these soaps, the addition of acid and salt in the precipitation of the polymer precipitates the free dehydroabietic acid in the polymer. The polymer may then be washed until from about 0 to about 5% of dehydroabietic acid remains in the polymer. This has the advantage of eliminating the necessity for washing the polymer completely free of the emulsifying agent, as has to be done in the case of fatty acid soaps, and at the same time permits a means of simply and uniformly incorporating a small amount of dehydroabietic acid in the polymerized material. In fact, an additional amount of dehydroabietic acid may be added to the polymer to provide an amount of up to about 10% by weight of polymer, in order to take advantage of the improvements made by the presence of dehydroabietic acid in the finished product.

The rubberlike polymers formed by emulsion polymerization of butadiene and styrene in the presence of dehydroabietic acid soaps and containing, as a result thereof, an amount of dehydroabietic acid up to about 5%, exhibit exceptionally high tensile strengths and elongations when compounded and vulcanized. The tack, building properties, and mill behavior in the unvulcanized state are also noticeably improved. The dehydroabietic acid may, if desired, be washed completely out of the polymer, and the resulting polymer will still have an improved millability over that of a polymer prepared with a fatty acid soap.

The alkali metal salts of dehydroabietic acid may be used alone or combined with fatty acid soaps as the emulsifying agent in polymerization by the emulsion technique. An amount of fatty acid soap up to about 75% may be used in the combination of the alkali metal salts of dehydroabietic acid with fatty acid soaps, and a preferable combination consists of a 50:50 mixture of the two soaps. One of the advantages in using such a mixed emulsifying agent is that certain of the less expensive fatty acid soaps, which are themselves unsatisfactory for emulsion polymerizations, may be used when used in combination with a soap of dehydroabietic acid.

Compounds which may be advantageously polymerized in aqueous emulsion by means of the soaps of dehydroabietic acid include the conjugated butadiene hydrocarbons, butadiene and its derivatives, such as isoprene, dimethyl butadiene, chloroprene, etc., and other compounds containing the vinyl group, such as styrene, acrylonitrile, etc. The alkali metal salts of dehydroabietic acid have been found to be excellent emulsifying agents particularly in the preparation of the copolymers of butadiene and styrene or acrylonitrile, isoprene and styrene or acrylonitrile, and other rubberlike copolymers, as well as in the preparation of polymers such as polyvinyl chloride, polyvinyl acetate, polystyrene, polymethyl methacrylate, polyvinylidene chloride, and the various other addition polymers which may be prepared by the emulsion technique.

The polymerizations in which dehydroabietic acid soaps are used may be subjected to the same variations in reaction conditions, e. g., concentration of reactants, temperature, pressure, etc., as those in which a fatty acid soap is used. The temperature of the reaction may vary from about 20° C. to about 100° C., preferably from about 40° C. to about 60° C., and the concentration of the emulsifying agent may be varied from about 1 to about 5%, preferably from about 2 to about 3%. The polymerization, in general, is carried out with the use of a peroxide catalyst, such as potassium persulfate, tertiary-butyl hydroperoxide, benzoyl peroxide, etc. Dehydroabietic acid soaps may also be used in combination with any desired initiator, or other polymerization or processing aid.

This application constitutes a division of our application for United States Letters Patent, Serial No. 603,746, filed July 7, 1945, which is a continuation-in-part of our application for United States Letters Patent, Serial No. 540,887, filed June 17, 1944, now abandoned.

What we claim and desire to protect by Letters Patent is:

1. The process which comprises polymerizing a monomeric material consisting essentially of styrene in aqueous emulsion in the presence of an alkali metal salt of dehydroabietic acid as the emulsifying agent.

2. The process which comprises polymerizing a monomeric material consisting essentially of styrene in aqueous emulsion in the presence of an alkali metal salt of dehydroabietic acid and a fatty acid soap as the emulsifying agents.

3. The process which comprises polymerizing a monomeric material consisting essentially of styrene in aqueous emulsion in the presence of sodium dehydroabietate as the emulsifying agent.

JOSEPH N. BORGLIN.
PHILIP A. RAY.

REFERENCES CITED

The following references are of record in the file of this patent:

UNITED STATES PATENTS

| Number | Name | Date |
|---|---|---|
| 2,005,295 | Meisenburg | June 18, 1935 |
| 2,201,237 | Littmann | May 21, 1940 |
| 2,338,517 | Kitani et al. | Jan. 4, 1944 |
| 2,388,477 | Fryling | Nov. 6, 1945 |
| 2,388,600 | Collins | Nov. 6, 1945 |

OTHER REFERENCES

Mark et al., High Polymeric Reactions, Interscience, 1941, pages 81 to 83 and 329.